US008453684B2

(12) United States Patent  (10) Patent No.: US 8,453,684 B2
Lolli  (45) Date of Patent: Jun. 4, 2013

(54) SEALING FLUID CANISTER, AND REPAIR KIT COMPRISING SUCH A CANISTER

(75) Inventor: Sergio Lolli, Pesaro (IT)

(73) Assignee: Tek Global S.r.l., Pesaro (IT)

( * ) Notice: Subject to any disclaimer, the term of this patent is extended or adjusted under 35 U.S.C. 154(b) by 323 days.

(21) Appl. No.: 12/857,802

(22) Filed: Aug. 17, 2010

(65) Prior Publication Data
US 2011/0041951 A1 Feb. 24, 2011

(30) Foreign Application Priority Data

Aug. 21, 2009 (IT) .............................. TO2009A0657

(51) Int. Cl.
B65B 31/00 (2006.01)
(52) U.S. Cl.
USPC ............. 141/38; 141/104; 141/105; 141/302; 81/15.6; 137/223
(58) Field of Classification Search
USPC ............. 141/38, 67, 100, 104, 105, 114, 231, 141/285, 301, 302, 309, 313; 81/15.6; 137/223
See application file for complete search history.

(56) References Cited

U.S. PATENT DOCUMENTS

| 7,694,698 | B2 * | 4/2010 | Marini ............................. 141/38 |
| 7,926,521 | B2 * | 4/2011 | Izumoto et al. ............... 141/105 |
| 2005/0265873 | A1 * | 12/2005 | Chou ............................. 417/552 |
| 2008/0029181 | A1 | 2/2008 | Marini et al. |
| 2009/0056850 | A1 | 3/2009 | Yanagi et al. |

FOREIGN PATENT DOCUMENTS
WO 2005/110825 A1 11/2005

* cited by examiner

Primary Examiner — Gregory Huson
Assistant Examiner — Jason K Niesz
(74) Attorney, Agent, or Firm — Ladas & Parry LLP

(57) ABSTRACT

A canister for sealing fluid for repairing inflatable articles has a bottle defining an inner volume for the sealing fluid; a first inlet port and an outlet port connected fluidically by the inner volume; at least one non-return valve downstream from the inner volume and open to permit outflow of the sealing fluid from the outlet port; and a second inlet port connected to the outlet port, downstream from the at least one non-return valve.

12 Claims, 3 Drawing Sheets

SEALING FLUID CANISTER, AND REPAIR KIT COMPRISING SUCH A CANISTER

The present invention relates to a canister assembly and relative kit for repairing and inflating inflatable articles, such as tyres.

BACKGROUND OF THE INVENTION

A kit is known comprising a canister of sealing fluid connected to a first hose connectable to a tyre safety valve; and a second hose parallel to the canister and to the first hose with respect to a compressed-air source.

To repair a tyre, compressed air is fed to the canister to inject the sealing fluid. Alternatively, to inflate a tyre, compressed air is fed directly to the second hose.

Kits of the above type are efficient, but comprise a relatively large number of component parts.

SUMMARY OF THE INVENTION

It is an object of the present invention to provide a canister assembly and relative kit designed to eliminate the above drawback.

According to the present invention, there are provided a canister assembly and relative kit as claimed in the attached Claims.

BRIEF DESCRIPTION OF THE DRAWINGS

A number of non-limiting embodiments of the invention will be described by way of example with reference to the accompanying drawings, in which.

DETAILED DESCRIPTION OF THE INVENTION

Figure 1:
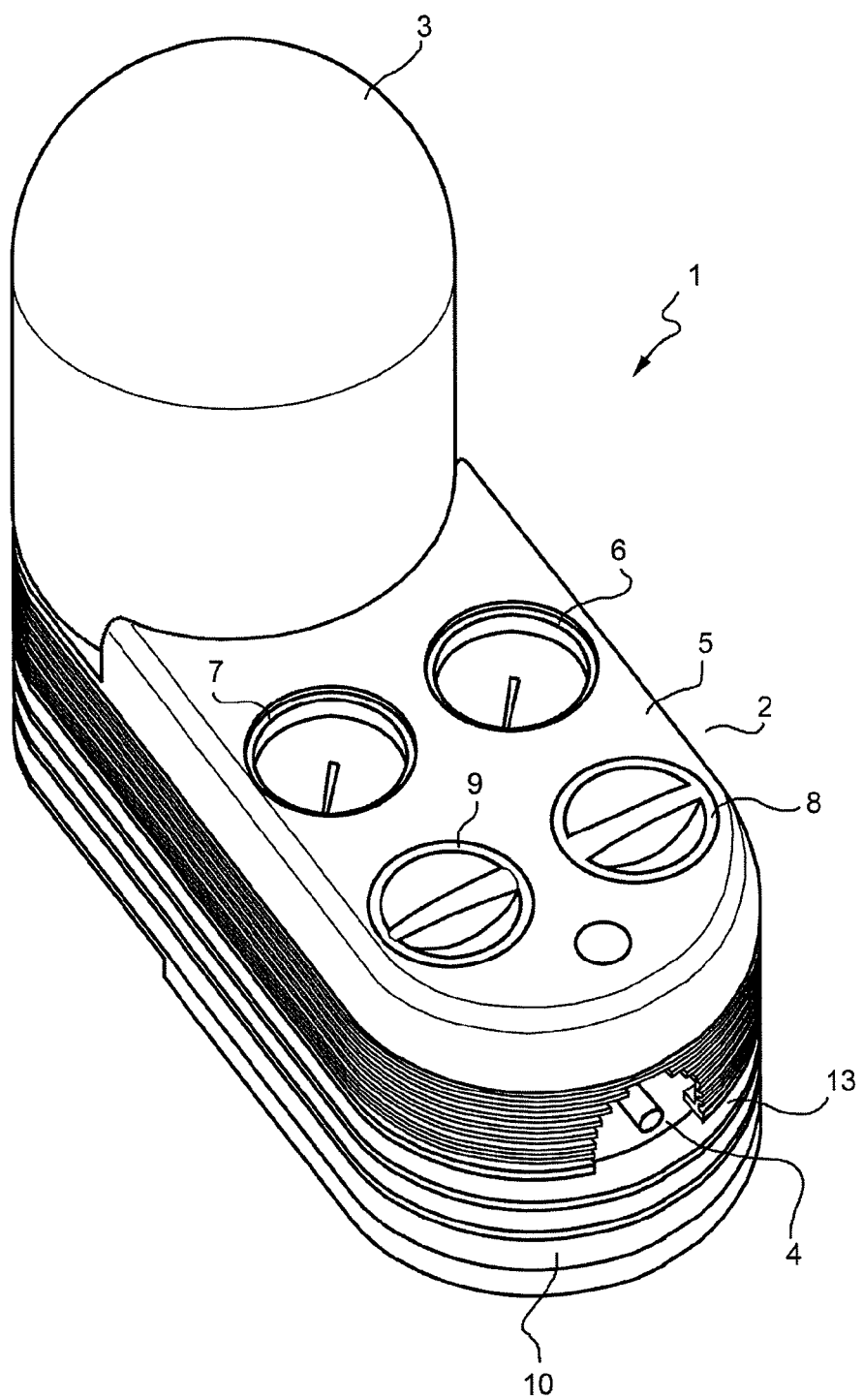
FIG. 1 shows a view in perspective of a kit in accordance with the present invention.

Number 1 in FIG. 1 indicates as a whole a tyre repair and inflation kit comprising a casing 2; a canister 3 of sealing fluid; and a compressed-air inlet 4 formed in casing 2.

Casing 2 comprises a top wall 5 fitted with a first and second gauge 6, 7 and a first and second knob 8, 9.

A lateral wall of casing 2 defines a peripheral groove, which coils more than one complete turn about the casing to house a hose 10 connected fluidically to canister 3, which is housed at least partly inside a seat formed in casing 2, on the opposite side of gauges 6, 7 and knobs 8, 9 to inlet 4.

Figure 2:
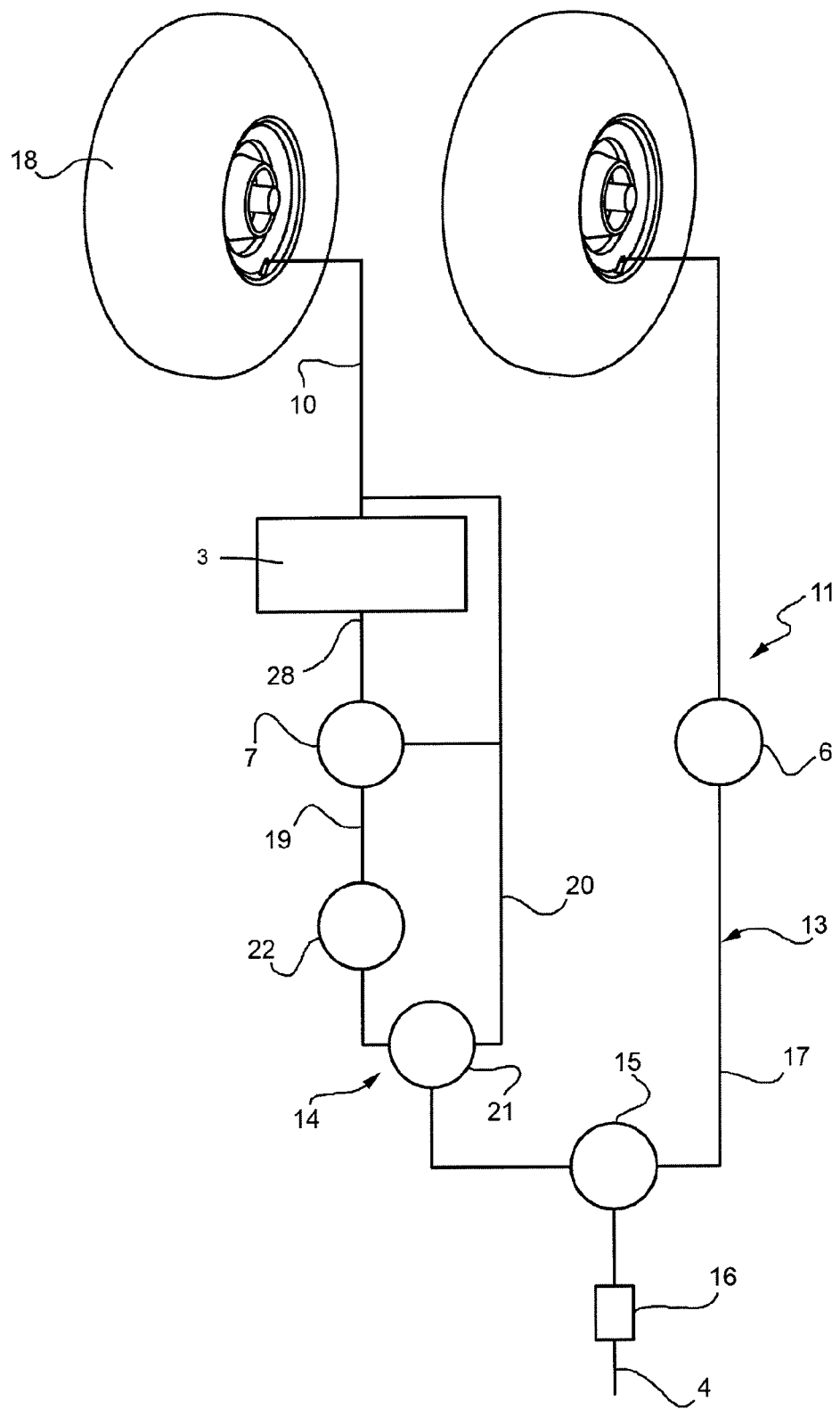
FIG. 2 shows a fluidic diagram of a kit in accordance with the present invention.

FIG. 2 shows a diagram of a fluidic circuit 11 housed at least partly inside casing 2.

Fluidic circuit 11 comprises inlet 4; a repair branch 14 and an inflation branch 13 selectable by a one-inlet, two-outlet selector valve 15 switched manually by the user by means of knob 8; and a pressure-reducing valve 16 series connected to inlet 4 and the inlet of selector valve 15.

Inflation branch 13 comprises a line 17 connecting inlet 4 directly to a tyre; and gauge 6 measures the pressure along line 17 when compressed air is supplied to a tyre 18.

Repair branch 14 comprises a line 19 series connected to canister 3; and a bypass line 20 parallel to line 19 with respect to a second one-inlet, two-outlet selector valve 21 switched manually by means of knob 9 and located upstream from canister 3 and downstream from selector valve 15.

Line 20 is connected to hose 10 downstream from canister 3, as explained in more detail below; and lines 20 and 19 share gauge 7, which is connected to both by an OR fluidic element that automatically connects gauge 7 to the line 19, 20 with the higher operating pressure. Repair branch 14 also comprises a pressure-reducing device 22, e.g. for reducing pressure by lamination and therefore locally, located between selector valve 21 and canister 3.

Figure 3:
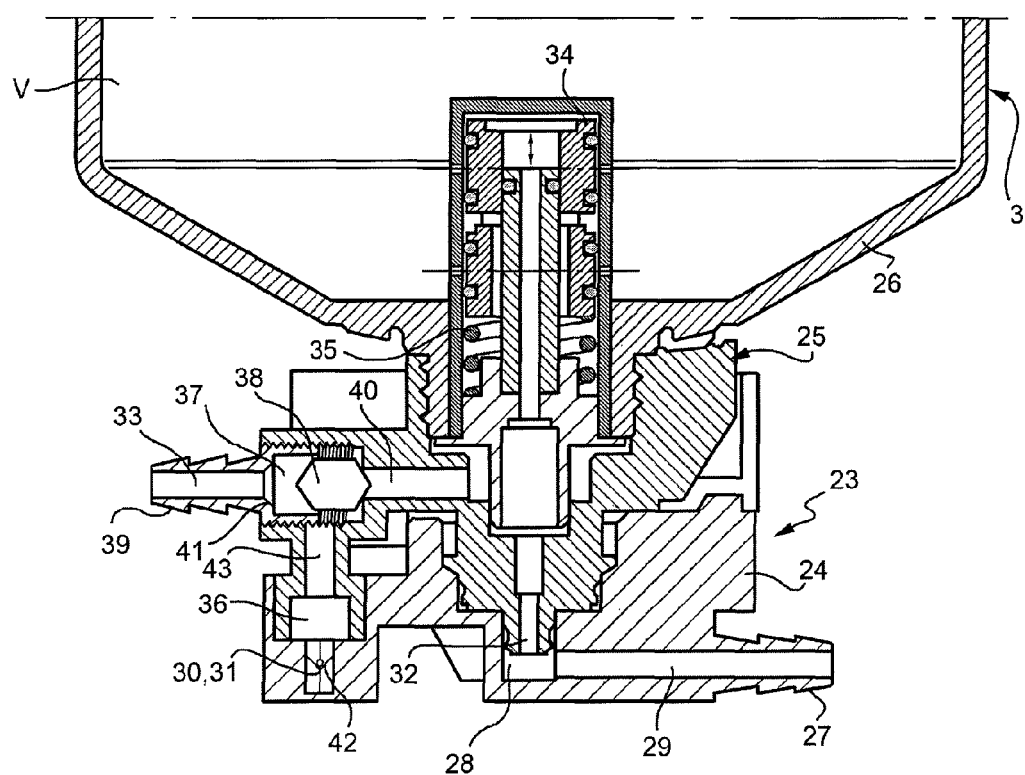
FIG. 3 shows a section of a component part of the FIG. 1 kit.

FIG. 3 shows a connecting device 23 for connecting canister 3 to circuit 11, and which comprises a base 24 fixed with respect to casing 2 and preferably defining a receptacle; and an insert 25 connected to a bottle 26 of canister 3 and preferably defining a plug. Connecting device 23 is releasable and fluidtight, preferably clicks into place, and even more preferably clicks into place in a straight-line movement for easy use.

Base 24 defines a first inlet 27 connected to line 19, a first outlet 28 connected to first inlet 27 by a conduit 29, a second inlet 30 and second outlet 31 connected fluidically to each other. More specifically, first inlet 27 is connected to line 19; second inlet 30 is connected to line 20; first outlet 28 is connected to an inlet port 32 of insert 25; and second outlet 31 is connected to an outlet port 33 of insert 25. More specifically, inlet port 32 and outlet port 33 are connected fluidically to each other by the inner volume V of bottle 26, so that line 19 is connected to hose 10 via inner volume V, and line 20 is connected to hose 10 downstream from inner volume V. In a preferred embodiment of the present invention, canister 3 comprises a normally-closed valve 34, which switches automatically to an open position to connect inlet. 27 fluidically to outlet port 33 when pressure exceeds a given threshold defined by the stiffness of a spring 35.

Insert 25 also comprises a second inlet port 36, which is parallel to outlet port 33 with respect to valve 34, is connected to second outlet 31, and comes out inside a chamber 37 located downstream from valve 34 and inside insert 25. In a preferred embodiment of the present invention, chamber 37 houses a moving body 38, which forms a non-return valve to cut off access to inner volume V when line 20 is pressurized, and to permit sealing fluid flow to hose 10 when line 19 is pressurized. Chamber 37 is preferably bounded partly by insert 25, and partly by a member 39, which is connectable removably to insert 25, may comprise a tubular body defining outlet port 33, and may be connected non-removably to hose 10. For example, to permit outflow of the sealing fluid when line 19 is pressurized, body 38 is movable between a first stop, to close a conduit 40 connecting chamber 37 to the outlet of valve 34, and a second stop, e.g. defined by member 39, which has a number of holes 41 connected fluidically to outlet port 33, and which are open even when body 38 is positioned contacting member 39.

To prevent interference with the operation of line 20, connecting device 23 also comprises a valve 42 to close line 20 when the sealing fluid is injected into the tyre. More specifically, valve 42 is a non-return, i.e. pressure-activated, valve, and may be fitted to base 24 or insert 25.

Canister 3 and kit 1 operate as follows.

When kit 1 is connected by inlet 4 to a pressure source, e.g. the compressed-air circuit of a heavy-duty vehicle, the user selects inflation or repair mode using knob 8 and selector valve 15. Whichever mode is selected, the pressure to valve 15 is regulated, in particular reduced, e.g. from 12 to 10 bars, by pressure-reducing valve 16.

In inflation mode, the user connects line 17 directly to the tyre, and monitors the pressure on gauge 6. Line 17 is housed inside a helical groove in the perimeter of casing 2 and similar to that of hose 10.

In repair mode, the user connects hose 10 to the tyre, and then selects line 19 using knob 9 and selector valve 21.

Pressure is further reduced by pressure-reducing device 22 to an optimum sealing fluid injection pressure compatible with the mechanical strength of canister 3 and the fluidtight seals, e.g. 4 bars. The compressed-air pressure is high enough to open valve 34, so that sealing fluid flows along conduit 40 to outlet port 33. More specifically, body 38 contacts the second stop, and the sealing fluid flows through chamber 37 and holes 41 into hose 10; and non-return valve 42 is closed to prevent backflow of the sealing fluid along line 20 to selector valve 21.

Once the sealing fluid is injected into the tyre, the user may set knob 9 to switch selector valve 21 and pressurize line 20. Runout of canister 3 may be shown by a transparent wall of a component part along the sealing fluid outflow route from bottle 26. For example, hose 10 or a part at least partly defining conduit 40 and/or chamber 37 is made of transparent material.

The compressed air along line 20 is at a higher pressure, e.g. 10 bars, than the compressed-air supply to canister 3, to inflate the tyre quickly. The compressed air opens non-return valve 42, flows through second inlet 30, second outlet 31, and chamber 37 to outlet port 33, and moves body 38 onto the first stop to close conduit 40, so the 10-bar pressure acts on the surfaces downstream from body 38, which thus protects components such as valve 34 and bottle 26 from overpressure.

When post-injection inflation is also completed, the user disconnects canister 3 from base 24. More specifically, once the sealing fluid is injected and the tyre inflated, bottle 26, valve 34, insert 25, and hose 10 are all replaced to save the user the trouble of cleaning sealing fluid residue off the kit. Preferably, the above parts form a single unit removable from base 24 and replaceable with an identical unit with a full bottle 26 of sealing fluid.

Canister 3 and kit 1 as described have the following advantages.

Because second inlet port 36 of canister 3 is located downstream from volume V, injection and inflation can both be carried out using one hose 10, and the component parts soiled with sealing fluid after use can be replaced to avoid cleaning kit 1.

Being overload-protected by body 38, bottle 26 and valve 34 can be designed more simply.

Clearly, changes may be made to canister 3 and kit 1 as described and illustrated herein without, however, departing from the protective scope defined in the accompanying Claims.

Body 38 may be eliminated, and valve 32 designed to close when compressed air flows along line 20, and to withstand the pressure of the airflow.

Non-return valve 42 may be fitted to insert 25, inside a conduit 43 connecting second inlet port 36 to outlet port 33.

Selector valve 15 and/or line 17 and/or gauge 6 and/or pressure-reducing valve 16 may be eliminated, in which case, kit 1 comprises one hose 10 replaceable together with canister 3. To inflate a tyre, line 20 is pressurized by second selector valve 21; and, to repair a tyre, the user performs the operations described above.

If no selector valve 15 is provided, casing 2 may preferably, though not exclusively, house a compressor assembly comprising an electric motor, and a compressor driven by the electric motor to generate and feed compressed air to the inlet of selector valve 21. In which case, pressure-reducing valve 16 and inlet 4 are not required.

The invention claimed is:

1. A canister (3) for sealing fluid for repairing inflatable articles, the canister comprising a bottle (26) defining an inner volume (V) for the sealing fluid; a first inlet port (32) and an outlet port (33) connected fluidically by said inner volume (V); and at least one openable closure (34; 38) downstream from said inner volume (V) and adapted to be opened to permit outflow of the sealing fluid from said outlet port (33); and the canister being characterized by comprising a second inlet port (36) connected to said outlet port (33) downstream from said at least openable closure (34; 38).

2. A canister as claimed in claim 1, characterized by comprising a second openable closure (38; 42) downstream from said second inlet port (36).

3. A canister as claimed in claim 2, characterized in that said second openable closure (38) is designed to cut off access to said inner volume (V) when compressed air flows into said second inlet port (36).

4. A canister as claimed in claim 1, characterized by comprising an insert (25) defining at least said first inlet port (32) and connectable releasably to a base (24) designed to keep said bottle (26) in a suitable in-use position.

5. A canister as claimed in claim 1, characterized by comprising a hose (10) connected in a fixed manner to said outlet port (33).

6. A kit for repairing and inflating inflatable articles, the kit comprising a casing (2); a base (24) fixed with respect to said casing (2) and defining a first inlet (27) and a second inlet (30); and a canister (3) as claimed in claim 1 and connected releasably to said base (24); and wherein said first and second inlet port (32, 36) are connected fluidically to said first and second inlet (27, 30) respectively.

7. A kit as claimed in claim 6, characterized by comprising a first line (19) connected to said first inlet (27); a second line (20) connected to said second inlet (30); and a selector valve (15) connected to said first and second line (19, 20) upstream from said first and second inlet (27, 30), to control a compressed-air flow.

8. A kit as claimed in claim 7, characterized by comprising at least one fluidic member (16; 22) for locally reducing the pressure of said compressed-air flow.

9. A kit as claimed in claim 8, characterized in that said fluidic member (22) is located along said first line (19) to reduce the inflow pressure to said canister (3).

10. A kit as claimed in claim 7, characterized by comprising a compressor assembly housed in said casing (2) and connected to said selector valve (15).

11. A canister as claimed in claim 1 wherein said openable closure is a non-return valve.

12. A canister as claimed in claim 2 wherein said second openable closure is a non-return valve.

* * * * *